US009880323B2

(12) United States Patent
Cormary et al.

(10) Patent No.: US 9,880,323 B2
(45) Date of Patent: Jan. 30, 2018

(54) COMPOSITIONS OF PHOTOSWITCHABLE MATERIALS

(71) Applicants: Benoit Cormary, Montgiscard (FR); Isabelle Malfant, Goyrans (FR)

(72) Inventors: Benoit Cormary, Montgiscard (FR); Isabelle Malfant, Goyrans (FR)

(73) Assignee: CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 537 days.

(21) Appl. No.: 14/361,046

(22) PCT Filed: Dec. 5, 2012

(86) PCT No.: PCT/FR2012/052814
§ 371 (c)(1),
(2) Date: May 28, 2014

(87) PCT Pub. No.: WO2013/083920
PCT Pub. Date: Jun. 13, 2013

(65) Prior Publication Data
US 2014/0332738 A1    Nov. 13, 2014

(30) Foreign Application Priority Data

Dec. 6, 2011  (FR) ...................... 11 61222

(51) Int. Cl.
*G02B 5/23*     (2006.01)
*G02B 1/04*     (2006.01)
*C09K 9/02*     (2006.01)
*G11B 7/2492*   (2013.01)

(52) U.S. Cl.
CPC .................. *G02B 1/04* (2013.01); *C09K 9/02* (2013.01); *G02B 5/23* (2013.01); *G11B 7/2492* (2013.01); *C09K 2211/1007* (2013.01); *C09K 2211/1029* (2013.01); *C09K 2211/185* (2013.01)

(58) Field of Classification Search
USPC ................................................ 252/856, 586
See application file for complete search history.

(56) References Cited

U.S. PATENT DOCUMENTS

| 5,821,287 A | 10/1998 | Hu et al. |
| 6,433,270 B1 | 8/2002 | Rack |
| 8,617,435 B2 * | 12/2013 | Malfant ................ B82Y 30/00 252/586 |

FOREIGN PATENT DOCUMENTS

| EP | 0592366 A1 | 4/1994 |
| WO | 01-21727 | 3/2001 |
| WO | 2006/019435 A1 | 2/2006 |
| WO | 2010/081977 A1 | 7/2010 |

OTHER PUBLICATIONS

E.B. Yagubskii et al.: "Bifunctional compounds based on transition metal mononitrosyl complexes combining photochrmism and electric conductivity or photochromism and magnetism", Nanotechnologes in russia, vol. 3, No. 3-4, Apr. 1, 2008, p. 151-165.*
Kushch et al. Potential photomagnetic materials based on cation photochromic mononitrosyl complex of ruthenium, J. Phys. IV france, vol. 114. Jan. 1, 2004, p. 459-462.*
E. B. Yagubskii et al.: "Bifunctional compounds based on transition metal mononitrosyl complexes combining photochromism and electric conductivity or photochromism and magnetism", Nanotechnologies in Russia, vol. 3, No. 3-4, Apr. 1, 2008 (Apr. 1, 2008), pp. 151-165, XP055025687, ISSN: 1995-0780, DOI: 10.1134/S1995078008030026 p. 151-p. 163; figures.
L.A. Kushch et al.: "Potentional photomagnetic materials based on cation photochromic mononitrosyl complex of ruthenium", J. Phys. IV France, vol. 114. Jan. 1, 2004 (Jan. 1, 2004), pp. 459-462. XP055025686, 001: 10.1051/jp4:20041140107 p. 459-p. 462; figures.
International Search Report, dated Feb. 28, 2013, from corresponding PCT application.

* cited by examiner

*Primary Examiner* — Monique R Peets
(74) *Attorney, Agent, or Firm* — Young & Thompson

(57) ABSTRACT

Method of production of a photochromic composite material, in which, starting from a photochromic ruthenium complex with nitrosyl ligand, with a silica matrix by a sol-gel process or with a biodegradable matrix, in particular of starch or of agar-agar, so that the photochromic ruthenium complex with nitrosyl ligand, in the crystalline state and in the form of nanoparticles, is inserted into the nanopores of the matrix.

3 Claims, No Drawings

COMPOSITIONS OF PHOTOSWITCHABLE MATERIALS

The invention relates to novel compositions of photochromic complexes of ruthenium with a nitrosyl ligand and of matrices.

The technological background is illustrated by document WO 2006/019435, which describes methods of manufacture of photosensitive microparticles and aqueous compositions comprising them, document U.S. Pat. No. 5,821,287, which relates to the synthesis of photochromic compounds, and document EP-A-0592366, relating to photochromic compounds.

The more recent document WO 2010/081977, which is regarded as the closest prior art, relates to a sol-gel process for producing a photochromic composite material, said photochromic composite material thus produced, and a high-quality, notably high-capacity, optical storage medium, comprising at least one such photochromic composite material.

A sol-gel process starting from a precursor and a photochromic complex, described in document WO 2010/081977, is carried out as follows:
- an alkoxysilane is selected as precursor and a ruthenium complex with a nitrosyl ligand is selected as photochromic complex, and
- the following successive steps are carried out: hydrolysis, disposition in a container of chosen shape, condensation (or polymerization or gelation), maturation and aging, this last-mentioned step including final drying, in such a way that for the steps of maturation and aging, the pH, temperature and time are selected so that, in the xerogel produced, the shape of which is determined by that of the container, the photochromic ruthenium complex with a nitrosyl ligand, in the crystalline state and in the form of nanoparticles, is inserted into the nanopores of the silica matrix that are distributed at least substantially homogeneously.

According to document WO 2010/081977, the photochromic complex is selected from the group comprising) [RuCl(NO)(py)$_4$][PF$_6$]$_2 \cdot \frac{1}{2}$H$_2$O and [RuY(NO)(py)$_4$]X$_2$ in which Y is Cl, Br or OH, and X is selected from the family comprising Br, Cl, PF$_6$, BF$_4$.

Starting from document WO 2010/081977, the problem on which the present invention is based is to envisage other compositions.

For this purpose, and according to a first aspect and a first embodiment, the invention relates to a sol-gel process for producing a photochromic composite material, in which, starting from a precursor and a photochromic ruthenium complex with a nitrosyl ligand, the following successive steps are carried out: hydrolysis, disposition in a container, condensation, maturation and aging including final drying, where the pH, temperature and time are selected so that in the xerogel produced, depending on the shape of the container, the photochromic ruthenium complex with a nitrosyl ligand, in the crystalline state and in the form of nanoparticles, is inserted into the nanopores of the matrix.

According to the invention, in combination,
- a silica matrix is selected as matrix, and
- a complex of the following formula is selected as photochromic ruthenium complex with a nitrosyl ligand:

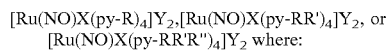

py denotes pyridine and Ru denotes ruthenium,
X is selected from the family comprising Cl, Br, OH,
Y is selected from the family comprising Cl, Br, BF$_4$, PF$_6$,
R, R', R" are selected from the family comprising hydrogen, alkyl groups, alcohol groups, aldehyde groups, ketone groups, ester groups, ether groups, amine groups, amide groups and halogenated groups, excluding the combination of a silica matrix and a photochromic ruthenium complex with a nitrosyl ligand of formula [Ru(NO)X(py)$_4$]Y$_2$ or [RuCl(NO)(py)$_4$](PF$_6$)$_2 \cdot \frac{1}{2}$H$_2$O.

For example, the equatorial ligands are of the vinylpyridine, pyridine carboxaldehyde, picoline, phenyl pyridine type, this list being illustrative and not in any way limiting.

According to one embodiment, the precursor is selected from the group comprising tetramethoxyorthosilane—TMOS—, vinyltriethoxysilane—VTES—, tetraethoxyorthosilane—TEOS—, or alkoxides M(OR)x, where M is a metal and R is an alkyl group.

According to one embodiment, complete hydrolysis of the alkoxide is carried out, all of the OR groups being replaced with OH groups.

According to one embodiment, the alkoxide is mixed with methanol and the mixture is stirred.

According to one embodiment, after the hydrolysis step has started, the selected photochromic complex, itself in solution, in particular in water or, if that is not possible, in acetonitrile, is added to the precursor.

According to one embodiment, an acid pH (<7) is selected for the steps of maturation and aging.

Depending on the embodiments, the duration of the maturation step, in the presence of acetonitrile, is of the order of a week at a temperature of the order of 55° C. in a closed atmosphere, or in the presence of water it is of the order of 72 hours at room temperature.

According to one embodiment, the duration of the aging step is of the order of a week at a temperature of the order of 55° C.

According to the same first aspect but a second embodiment, the invention relates to a process for producing a photochromic composite material, in which, starting from a biodegradable matrix and a photochromic ruthenium complex with a nitrosyl ligand, the following steps are carried out: dissolution of the biodegradable matrix, dispersion of the photochromic complex, disposition in a container, drying, where the temperature and time are selected so that in the matrix produced, depending on the shape of the container, the photochromic ruthenium complex with a nitrosyl ligand, in the crystalline state and in the form of nanoparticles, is inserted into the nanopores of the matrix, in which, in combination:
- a biodegradable matrix, in particular of starch or of agar-agar, is selected as matrix, and
- a complex of the following formula is selected as photochromic ruthenium complex with a nitrosyl ligand: [Ru(NO)X(py-R)$_4$]Y$_2$, [Ru(NO)X(py-RR')$_4$]Y$_2$, [Ru(NO)X(py-RR'R")$_4$]Y$_2$ or [Ru(NO)X(py)$_4$]Y$_2$ where:
  py denotes pyridine and Ru denotes ruthenium,
  X is selected from the family comprising Cl, Br, OH,
  Y is selected from the family comprising Cl, Br, BF$_4$,
  R, R', R" are selected from family comprising hydrogen, alkyl groups, alcohol groups, aldehyde groups, ketone groups, ester groups, ether groups, amine groups, amide groups and halogenated groups.

According to both of these embodiments, the equatorial ligands are for example of the vinylpyridine, pyridine carboxaldehyde, picoline, phenyl pyridine type, this list being illustrative and not in any way limiting.

According to one embodiment, the operating steps are carried out at mild temperature and pressure, close to ambient.

According to one embodiment, a container in the form of a tube or a flat-bottomed dish is used, depending on whether we wish to produce a monolith or a plate.

According to both of these embodiments, the process has a low energy cost because it can be carried out at ambient temperature and pressure. It has a minimum of harmful effects on the environment, because it makes it possible to avoid the use of harmful solvents, using water instead.

According to both of these embodiments, finally the process is reproducible and can be applied on an industrial scale.

According to a second aspect, the invention relates to the photochromic composite material obtained by one or other of the two embodiments of the process for producing a photochromic composite material.

This photochromic composite material is such, depending on the embodiment of the process considered, that the xerogel or the biodegradable composite produced is of a shape determined by that of the container and comprises the selected photochromic ruthenium complex with a nitrosyl ligand, in the crystalline state and in the form of nanoparticles, inserted into the nanopores of the silica matrix or of the biodegradable matrix, in particular of starch or of agar-agar, distributed at least substantially homogeneously.

According to other characteristics:
the material is in the form of a monolith or in the form of a plate of desired thickness;
the average size of the nanopores of the silica matrix is between 2 and 15 nm;
the most numerous particles of the nanocrystals of photochromic complex are between 2 and 4 nm;
the average size of the nanocrystals in the biodegradable matrix is of the order of 50 nm.

These photochromic composite materials are, simultaneously, of controllable shape and size, strong, sufficiently thick when this is desired for large storage capacities, and transparent.

Finally, forming of this material by the two embodiments envisaged for the process does not have a negative effect on the existing switching properties on the single crystal of the ruthenium complex, namely a degree of conversion of the order of 100%.

According to a third aspect, the invention relates to a high-capacity optical storage medium comprising at least one photochromic composite material as has just been described.

Such a medium offers qualities of optical storage, notably of capacity, far superior to that proposed to date.

According to other characteristics of this optical storage medium:
its photoinduced population is close to that of single crystals of the photochromic complex;
its operating temperature is close to room temperature;
it displays a complete, reversible color change after irradiation;
its metastable states have a lifetime exceeding 9 years.

The invention will be well understood on reading the following description of several embodiments.

As mentioned, the invention has three aspects:
a process for producing a photochromic composite material, which can be envisaged according to two embodiments, one with a sol-gel process and the other with a biodegradable matrix a photochromic composite material of this kind, characterized in that it is obtained by this process, and
a high-quality, notably high-capacity, optical storage medium, comprising at least one such photochromic composite material.

The invention will now be described more especially in the case of the first embodiment of the process that is envisaged, namely with a sol-gel process and a silica matrix.

The sol-gel process, the material and the optical storage medium thus produced are derived from those described in document WO 2010/081977, already cited, which is expressly referred to.

Moreover, the principles of the process (or reaction) known by the name "sol-gel" are known or are easily accessible by a person skilled in the art from this document as well as from the document D. Levy, "Photochromic Sol-Gel materials", Chem. Mat., 9, 1997, 2666-2670.

The sol-gel method comprises the following successive steps:
hydrolysis,
condensation or, otherwise designated, polymerization or gelation,
drying.

In the sol-gel process according to the invention, a silica matrix is selected as matrix, the suitability of the choice of which was demonstrated in document WO 2010/081977.

In combination, a complex of the following formula is selected as photochromic ruthenium complex with a nitrosyl ligand:

$[Ru(NO)X(py-R)_4]Y_2, [Ru(NO)X(py-RR')_4]Y_2, [Ru(NO)X(py-RR'R'')_4]Y_2$ or $[Ru(NO)X(py)_4]Y_2$,
where:

py denotes pyridine and Ru denotes ruthenium,
X is selected from the family comprising Cl, Br, OH,
Y is selected from the family comprising Cl, Br, $BF_4$, $PF_6$,
R, R', R" are selected from the family comprising hydrogen, alkyl groups, alcohol groups, aldehyde groups, ketone groups, ester groups, ether groups, amine groups, amide groups and halogenated groups,
or of formula $[RuCl(NO)(py)4](PF6)2.\frac{1}{2}H_2O$.

The alkyl groups comprise for example the linear or branched alkyls having 1 to 4 carbon atoms, such as methyl, ethyl, n-propyl, isopropyl, or n-butyl.

The alcohol groups comprise for example —OH or the alkyl chains having 1 to 4 carbon atoms substituted with one or more —OH groups.

The aldehyde groups comprise for example —COH or the alkyl chains having 1 to 4 carbon atoms substituted with one or more —COH groups.

The ester groups comprise for example —$COR_1$, where $R_1$ is an alkyl having 1 to 4 carbon atoms.

The ether groups comprise for example —$OR_1$, where $R_1$ is an alkyl having 1 to 4 carbon atoms.

The amine groups comprise for example —$NH_2$, —$NHR_1$ or —$NR_1R_2$ where $R_1$ and $R_2$ are independently alkyls having 1 to 4 carbon atoms.

The amide groups comprise for example —$CONH_2$, —$CONHR_1$ or —$CONR_1R_2$ where $R_1$ and $R_2$ are independently alkyls having 1 to 4 carbon atoms.

The halogenated groups comprise for example chlorine, bromine, iodine or fluorine or the alkyl chains having 1 to 4 carbon atoms substituted with one or more halogen atoms, such as chlorine, bromine, iodine or fluorine.

Pyridine py, monosubstituted pyridine py-R, disubstituted pyridine py-RR' and trisubstituted pyridine py-RR'R" can be illustrated by the following schematic structures:

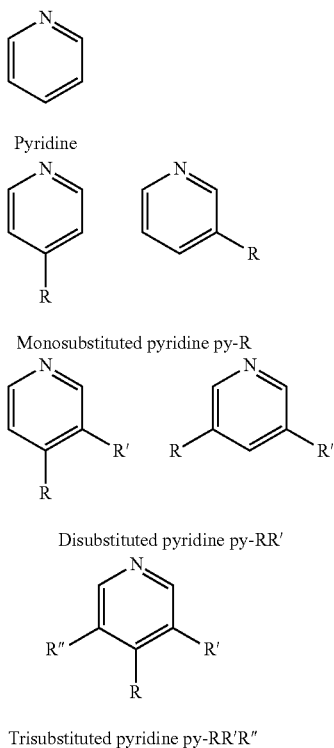

Pyridine

Monosubstituted pyridine py-R

Disubstituted pyridine py-RR'

Trisubstituted pyridine py-RR'R"

However, it is to be understood that the combination of a silica matrix and a photochromic ruthenium complex with a nitrosyl ligand of formula [Ru(NO)X(py)$_4$]Y$_2$ or [RuCl(NO)(py)$_4$](PF$_6$)$_2$.½H$_2$O, X and Y being as defined above, known per se, is excluded from the scope of the invention.

In one embodiment of the sol-gel process according to the invention, an alkoxysilane such as tetramethoxyorthosilane—TMOS— is employed as precursor. In other possible embodiments, vinyltriethoxysilane—VTES— is employed, or even tetraethoxyorthosilane—TEOS—, or more generally alkoxides M(OR)x, where M is a metal, such as aluminum or titanium, x is an integer that can be up to 4, and R is an alkyl group (having 1 to 4 carbon atoms), which are functionally equivalent.

The sol-gel process is carried out starting from the selected precursor, photochromic complex and matrix, by successive steps of hydrolysis, disposition in a container of chosen shape, condensation (or polymerization or gelation), maturation and aging, this last-mentioned step including final drying.

For the steps of maturation and aging, the pH, temperature and time are selected so that in the xerogel produced, whose shape is determined by that of the container, the photochromic ruthenium complex with a nitrosyl ligand, in the crystalline state and in the form of nanoparticles, is inserted into the nanopores of the silica matrix, being distributed at least substantially homogeneously.

The operating steps are carried out at mild temperature and pressure, close to ambient.

In the step of hydrolysis of the alkoxide, hydrolysis of the alkoxide can be complete if the proportions of water, the pH and the temperature are selected for this purpose. All of the OR groups are then replaced with OH groups.

For carrying out this step, the alkoxide is mixed with methanol and this mixture is stirred for the necessary time, for example of the order of five minutes. Hydrolysis is started by adding distilled water.

After a certain time, for example of the order of two minutes, the photochromic complex selected, itself in solution, is added to the precursor.

Stirring is continued for the necessary time, for example of the order of ten minutes.

In one embodiment, the proportions are 1 ml of tetramethoxyorthosilane (TMOS) and 1.2 ml of methanol and twice that amount, i.e. 2.4 ml of distilled water.

The photochromic complex as selected is used in water or in a solution of acetonitrile, for example in the case of [RuCl(NO)(py)$_4$](PF$_6$)$_2$.½H$_2$O, as this complex is not water-soluble.

Then, after the hydrolysis step, the precursor as selected and the photochromic complex as selected, in solution, are placed in a container of chosen shape, which determines the shape of the xerogel that will be produced, monolith or plate.

For example, it is possible to use a container such as a hemolysis tube to form a monolith and a container such as a flat-bottomed dish to form a plate of desired thickness.

The step of condensation (or polymerization or gelation) leads to the formation of bridging oxygen with elimination of a molecule of water or of alcohol. At the end of this step, the bridging oxygen atoms allow a three-dimensional silica network to form, which is obtained according to the following reaction balance:

The condensation step leads to the formation of a gel.

In the steps of maturation and then aging, the gel is stabilized: the polymerization that began previously continues, whereas the solvent located within the gel is expelled.

For the steps of maturation and aging, the pH, temperature and time are selected so that in the xerogel finally produced, the shape of which is determined by the container, the photochromic complex, in the crystalline state and in the form of nanoparticles, is inserted into the nanopores of the silica matrix, distributed at least substantially homogeneously.

Thus, in one embodiment, the pH selected is of the order of 5 to 5.6.

In an embodiment with acetonitrile, the maturation step can last for of the order of a week at a temperature of the order of 55° C., in a closed atmosphere. In an embodiment with aqueous solution, the maturation step can last for of the order of 72 hours at room temperature.

In one embodiment, the aging step can last for of the order of a week at a temperature of the order of 55° C.

The end of the aging step allows drying, by which the rest of the solvent is removed.

Drying by slow evaporation causes shrinkage of the network of the matrix, which can reduce the volume of the gel (for example a loss of volume of ⅓) and lead to formation of a xerogel, in the form of monolith or plate. However, if drying occurs in harsh conditions, beyond the critical point of the solvent, there is very little shrinkage of the wet gel and we do not obtain a xerogel as desired, but an aerogel.

If the steps of maturation and aging are too quick, undesirable cracks or fractures may form in the material produced.

When a water/methanol mixture is used (without acetonitrile), the higher the concentration of photochromic complex, the more intense the color of the gel. Conversely, when a water/methanol/acetonitrile mixture is used, when the concentration of photochromic complex exceeds 30 mmol·L$^{-1}$, the matrix is saturated with the complex, and crystals and powder form within and around the xerogel.

According to the invention—and as was illustrated above—, for the steps of maturation and aging, the pH, temperature and time are selected so that in the xerogel produced, the shape of which is determined by the container, the photochromic complex is in the crystalline state and in the form of nanoparticles and is inserted into the nanopores of the matrix, which are themselves distributed at least substantially homogeneously.

With the process as has just been described, photochromic composite materials are obtained that are homogeneous, transparent, easily shaped, and stable in normal conditions of temperature and pressure. Thus, it was found that the xerogels do not show any deterioration after four months and even up to seven months. These materials display excellent resistance to laser radiation, mechanical strength similar to that of glass, and good resistance to solvents.

As already pointed out, photochromic composite materials can be made in the form of monolith with length from 1 to 2 cm or in the form of plate from 1 to 3 cm$^2$ and of desired thickness.

The average size of the nanopores of the matrix produced without acid or basic catalysis is between 2 and 15 nm. They are distributed homogeneously.

The photochromic complexes are in the form of nanocrystals. Particles between 2 and 4 nm are the most numerous.

Taking into account the sizes and intermolecular distances involved, it is asserted that the smallest nanopores of the matrix contain one or two molecules of ruthenium with its counter-ions.

Analyses carried out on the composite materials obtained in tests showed that the particles are well diluted in the matrix and that the objects of nanometric size located in the nanopores do indeed consist of the photochromic complex.

The photochromism of the composite materials obtained according to the invention can be demonstrated.

A sample of this material is put in a cryostat and is then irradiated for 2 hours at a temperature of the order of 100 K. The sample is removed from the cryostat as quickly as possible. There is a color change of the sample, which changes from orange—the color in the ground state—to green—the color in the irradiated state.

When the sample is taken out of the cryostat, the temperature rise is very rapid and relaxation begins after just 1 minute. After a few minutes, the sample has returned to its orange color.

Thus, the photochromic composite materials produced have the characteristic of complete, reversible change of their color after irradiation. An estimate of the photoinduced population—of the order of 36%—shows that it is close to that observed on single crystals. These photochromic composite materials can be used at temperatures close to room temperature. As for the metastable states, their lifetime exceeds 9 years.

These photochromic composite materials are therefore perfectly well suited to constituting optical storage media of high quality, notably with respect to capacity.

The invention will now be described more particularly in the case of the second embodiment of the process that is envisaged, namely with a biodegradable matrix.

With the process according to this second embodiment, a biodegradable matrix, in particular of a polysaccharide such as starch (glucan) or agar-agar (galactan), is used—and therefore is selected.

If, as stated, the suitability of the choice of silica had been demonstrated in document WO 2010/081977, it is found that the use of a biodegradable matrix, in particular of a polysaccharide such as starch or agar-agar, intensifies the required photochromic properties. Thus, the degree of conversion of the photochromic complex in a biodegradable matrix, such as starch or agar-agar, is increased relative to the silica matrix. Moreover, the biodegradable matrix gives undeniable advantages from the standpoint of optical properties, cost and in environmental terms.

According to this second embodiment, a complex of the following formula is also selected as photochromic ruthenium complex with a nitrosyl ligand: [Ru(NO)X(py-R)$_4$]Y$_2$, [Ru(NO)X(py-RR')$_4$]Y$_2$, [Ru(NO)X(py-RR'R")$_4$]Y$_2$ or [Ru(NO)X(py)$_4$]Y$_2$ where:
  py denotes pyridine and Ru denotes ruthenium,
  X is selected from the family comprising Cl, Br, OH,
  Y is selected from the family comprising Cl, Br, BF$_4$
  R, R', R" are selected from the family comprising hydrogen, alkyl groups, alcohol groups, aldehyde groups, ketone groups, ester groups, ether groups, amine groups, amide groups and halogenated groups.

As before, the equatorial ligands are of the vinylpyridine, pyridine carboxaldehyde, picoline, phenyl pyridine type, this list being illustrative and not in any way limiting.

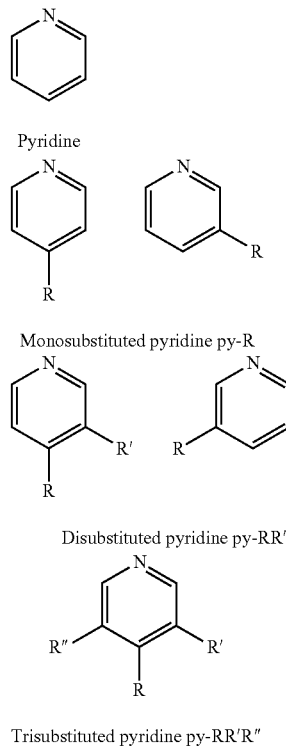

As before, the operating steps can be carried out at mild temperature and pressure, the advantages already mentioned in relation to the first embodiment also applying to the second.

In the case of a biodegradable matrix of starch, the procedure now disclosed can be followed.

Between 400 mg and 600 mg of corn starch is gradually added to 10 ml of distilled water. Then, according to an embodiment variant aiming to make the film more elastic, 0.2 ml of glycerol is added. This embodiment variant is optional.

The mixture obtained is heated to a temperature of the order of 100° C. in a covered beaker until a "clear" homogeneous white solution is obtained.

Then the heating is turned off. Once the mixture has cooled to a temperature of about 70-60° C., the ruthenium complex of the following formula is added to ethanol or water: $[Ru(NO)X(py\text{-}R)_4]Y_2$, $[Ru(NO)X(py\text{-}RR')_4]Y_2$, $[Ru(NO)X(py\text{-}RR'R'')_4]Y_2$ or $[Ru(NO)X(py)_4]Y_2$ where:

py denotes pyridine and Ru denotes ruthenium,

X is selected from the family comprising Cl, Br, OH,

Y is selected from the family comprising Cl, Br, $BF_4$,

R, R', R" are selected from the family comprising hydrogen, alkyl groups, alcohol groups, aldehyde groups, ketone groups, ester groups, ether groups, amine groups, amide groups and halogenated groups.

The mixture is then placed in the container of chosen shape.

Drying is carried out at room temperature for about ten days.

The invention claimed is:

1. A process for producing a photochromic composite material, in which, starting from a biodegradable matrix and a photochromic ruthenium complex with a nitrosyl ligand, the following steps are carried out:
   dissolving the biodegradable matrix to obtain a solution,
   dispersing the photochromic ruthenium complex into the solution to obtain a mixture,
   placing the mixture into a container, and
   drying the mixture to obtain a biodegradable matrix having nanopores, wherein a temperature and a time are selected so that, depending on the shape of the container, the photochromic ruthenium complex with a nitrosyl ligand, in the crystalline state and in the form of nanoparticles, is inserted into the nanopores of the biodegradable matrix, in which:
   the photochromic ruthenium complex with a nitrosyl ligand is selected from the group consisting of: $[Ru(NO)X(py\text{-}R)_4]Y_2$, $[Ru(NO)X(py\text{-}RR')_4]Y_2$, $[Ru(NO)X(py\text{-}RR'R'')_4]Y_2$ and $[Ru(NO)X(py)_4]Y_2$ where:
      py denotes pyridine,
      Ru denotes ruthenium,
      X is selected from the group consisting of Cl, Br, and OH,
      Y is selected from the group consisting of Cl, Br, and $BF_4$,
      R, R', R" are selected from the group consisting of hydrogen, alkyl groups, alcohol groups, aldehyde groups, ketone groups, ester groups, ether groups, amine groups, amide groups and halogenated groups.

2. The process of claim 1, wherein the biodegradable matrix is a polysaccharide.

3. The process of claim 1, wherein the biodegradable matrix is starch or agar-agar.

* * * * *